(12) United States Patent  (10) Patent No.: US 9,341,894 B2
Chen  (45) Date of Patent: May 17, 2016

(54) BACKLIGHT MODULE AND LIQUID CRYSTAL DISPLAY DEVICE USING SAME

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 55 days.

(21) Appl. No.: 14/467,862

(22) Filed: Aug. 25, 2014

(65) Prior Publication Data

US 2015/0062488 A1   Mar. 5, 2015

(30) Foreign Application Priority Data

Aug. 27, 2013   (TW) .............................. 102130523 A (51) Int. Cl.
*G02F 1/1335* (2006.01)
*F21V 8/00* (2006.01)

(52) U.S. Cl.
CPC ........ *G02F 1/133621* (2013.01); *G02B 6/0068* (2013.01); *G02F 1/133606* (2013.01); *G02F 2001/133622* (2013.01)

(58) Field of Classification Search
CPC ................................................ G02F 1/133621
See application file for complete search history.

(56) References Cited

U.S. PATENT DOCUMENTS

| | | | | |
|---|---|---|---|---|
| 8,379,172 B2 * | 2/2013 | Nagata | ................... | G02B 6/005 349/106 |
| 2008/0055515 A1 * | 3/2008 | Ha | ........................ | G02B 6/0056 349/61 |
| 2008/0192173 A1 * | 8/2008 | Itoh | ...................... | G02B 6/0016 349/61 |
| 2010/0073600 A1 * | 3/2010 | Itoh | ...................... | G02B 6/0028 349/65 |
| 2010/0214208 A1 * | 8/2010 | Itoh | ...................... | G02B 6/0001 345/102 |
| 2012/0127751 A1 * | 5/2012 | Kimmel | ............... | G02B 6/0036 362/602 |
| 2014/0177273 A1 * | 6/2014 | Chen | ................... | G02B 6/0035 362/609 |
| 2015/0168637 A1 * | 6/2015 | Chen | ................... | G02B 6/0068 362/609 |

* cited by examiner

*Primary Examiner* — Phu Vu
(74) *Attorney, Agent, or Firm* — Novak Druce Connolly Bove + Quigg LLP (57) ABSTRACT

A backlight module includes a number of laser units, a number of diffraction units, and a number of diverging units. Each laser unit includes three colored lasers arranged in a first straight line. The three lasers respectively emit red, green, and blue light. Each of the diffraction units includes three diffraction elements. The three diffraction elements are configured to diffract the light along the first straight line. Each of the diverging units is substantially an elongated semi-cylinder, and the longitudinal direction is along the first straight line. The diverging units diffract the three colors of light along a direction which is perpendicular to the direction of the first straight line.

11 Claims, 6 Drawing Sheets

FIG. 6

US 9,341,894 B2

BACKLIGHT MODULE AND LIQUID CRYSTAL DISPLAY DEVICE USING SAME

FIELD

The present disclosure is related to backlighting.

BACKGROUND

In a liquid crystal display device, cold cathode fluorescent tubes are generally used as a light source of a backlight module. The color reproduction range of a backlight module using cold cathode fluorescent tubes is only 70%~85% of the color reproduction range of a cathode ray tube (CRT). It is difficult to reproduce the high quality image for the liquid crystal display device. Therefore, various light sources have been studied to produce a wide reproduction color range. The backlight module using multiple colors (i.e., red, green, blue) light emitting diodes (LEDs) can increase the color reproduction range to 100%. But the lifetimes of different color LEDs are different from each other, it will result in the non-uniform color distribution of a backlight module after a period of use. A light source should have a stable wavelength and light intensity to improve the color reproduction range and non-uniform color distribution.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numbers designate corresponding parts throughout the several views. Implementations of the present technology will now be described, by way of example only, with reference to the attached figures.

DETAILED DESCRIPTION

A backlight module to enhance the wide color reproduction range and a liquid crystal display device using the backlight module as a light source is described. The disclosure is illustrated by way of example and not by way of limitation in the figures of the accompanying drawing in which like references indicate similar elements. It should be noted that references to "an" or "one" embodiment in this disclosure are not necessarily to the same embodiment, and such references mean "at least one."

The backlight module includes a number of laser units, a number of diffraction units, and a number of diverging units. Each of the laser units includes a first laser light source emitting a red light, a second laser light source emitting a green light and a third laser light source emitting a blue light. The first laser light source, the second laser light source, and the third laser light source are arranged along a straight line in a first direction. Each of the diffraction units includes three diffraction elements. The first diffraction element corresponds to the first laser light source and is used to diffract the red light from a point light source to a linear light source with a linear optical field distribution. The second diffraction element corresponds to the second laser light source and is used to diffract the green light from a point light source to a linear light source with a linear optical distribution. The third diffraction element corresponds to the third laser light source and is used to diffract the blue light from a point light source to a linear light source with a linear optical distribution. Each of the diverging units corresponds to a diffraction unit and is substantially an elongated semi-cylinder in shape to match the liner optical field distribution. The longitudinal direction of the diverging unit is along the first direction. The diverging unit is used to diverge the diffracted laser light along a second direction which is perpendicular to the first direction.

According to another aspect of the present disclosure, a liquid crystal display device is provided. The liquid crystal display device includes a backlight module and a liquid crystal display panel. The backlight module includes a number of laser units, a number of diffraction units, and a number of diverging units. Each of the laser units includes a first laser light source emitting a red light, a second laser light source emitting a green light and a third laser light source emitting a blue light. The first laser light source, the second laser light source, and the third laser light source are arranged along a straight line in a first direction. Each of the diffraction units includes three diffraction elements. The first diffraction element corresponds to the first laser light source and is used to diffract the red light from a point light source to a linear optical distribution. The second diffraction element corresponds to the second laser and is used to diffract the green light from a point light source to a linear light source with a linear optical distribution. The third diffraction element corresponds to the third laser and is used to diffract the blue light from a point light source to a linear light source with a linear optical distribution. Each of the diverging units corresponds to a diffraction unit and is substantially an elongated semi-cylinder in shape to match the linear optical field distribution. The longitudinal direction of the diverging unit is along the first direction. The diverging unit is used to diverge the diffracted laser light along a second direction which is perpendicular to the first direction. The liquid crystal display panel receives the light emitted from said diverging units, and said first laser, said second laser, and said third laser are controlled to sequentially turn on or turn off in order. This field sequential method is used to reduce the power consumption and heat generated.

The backlight module according to the present disclosure has a wide color reproduction range and a uniform luminance. In addition, the liquid crystal display device of the present disclosure using the backlight module of present disclosure has a color reproduction range wider than that of the conventional liquid crystal display device. Further, the liquid crystal display device uses a field sequential method to cyclically turn on or turn off the laser light. The power consumption and heat of the liquid crystal display device will be then greatly reduced.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 1:
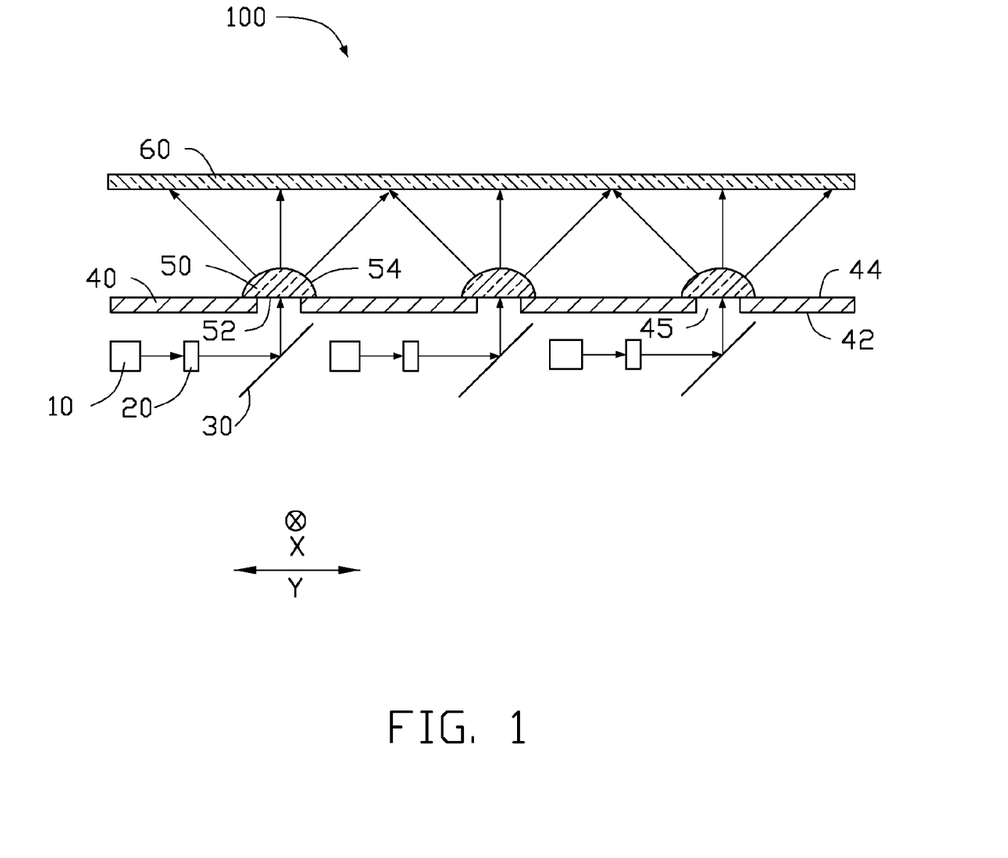
FIG. 1 is a diagrammatic sectional view of a backlight module according to a first embodiment of the present disclosure.
Figure 2:
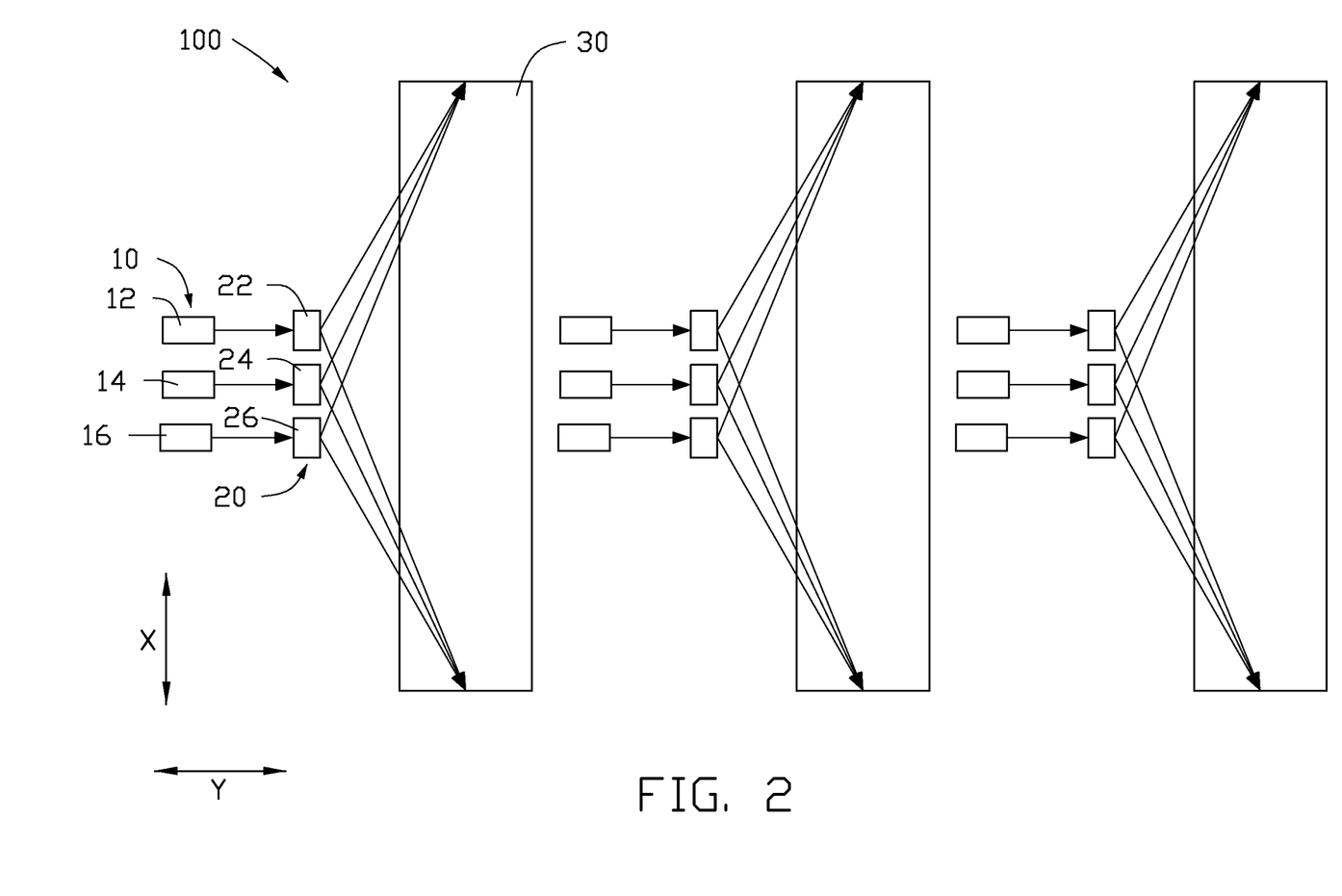
FIG. 2 is a diagrammatic view of the backlight module according to the first embodiment of the present disclosure.

FIGS. 1 and 2 respectively show a sectional view and plan view of a first embodiment of a backlight module 100. The backlight module 100 includes a plurality of laser units 10, a plurality of diffraction units 20, a plurality of reflection units 30, a bottom reflection sheet 40, a plurality of diverging units 50, and a diffusion plate 60. FIG. 2 shows three laser units 10, three diffraction units 20, three reflection units 30, and three diverging units 50, divided into three sets. In addition, the laser unit 10, the diffraction unit 20, the reflection unit 30, and the diverging unit 50 of each set are arranged in a particular order.

Each laser unit 10 includes a first laser light source 12, a second laser light source 14, and a third laser light source 16. The first laser light source 12 emits a collimated red light. The second laser light source 14 emits a collimated green light. The third laser light source 16 emits a collimated blue light. The first laser light source 12, the second laser light source 14, and the third laser light source 16 are arranged in a straight line along the first direction X, where the first direction X is perpendicular to the surface of the paper on which FIG. 1 is drawn and parallel to the drawing in FIG. 2.

The diffraction unit 20 is positioned on the light path of a laser unit 10. Each diffraction unit 20 includes a first diffraction element 22, a second diffraction element 24, and a third diffraction element 26. The first diffraction element 22 corresponding to the first laser light source 12 diffracts the light emitted by the first laser light source 12 from a point laser light source to a linear laser light source with a linear optical field distribution; that is, the light is diverged to form a linear laser light source along the first direction X after passing through the first diffraction element 22. The second diffraction element 24 corresponding to the second laser light source 14 diffracts the light emitted by the second laser light source 14 from a point laser light source to a linear laser light source with a linear optical field distribution; that is, the light is diverged to form a linear laser light source along the first direction X after passing through the second diffraction element 24. The third diffraction element 26 corresponding to the third laser light source 16 diffracts the light emitted by the third laser light source 16 from a point light source to a linear laser light source with a linear optical field distribution; that is, the light is diverged to form a linear laser light source along the first direction X after passing through the third diffraction element 26.

The reflection unit 30 corresponding to a diffraction unit 20 is located at the side of the diffraction unit 20 far away from the laser unit 10. The reflection unit 30 reflects the light from a diffraction unit 20 and laser unit 10 to a diverging unit 50. The reflection unit 30 can be a reflective mirror or other reflecting element. In other embodiments, the light from a linear laser light source can not be reflected by the reflection unit 30. The linear laser light source can be coupled to a diverging unit 50 after passing through the diffraction unit 20.

The reflection sheet 40 includes a bottom surface 42 and a reflection surface 44. The bottom surface 42 and the reflection surface 44 are located on opposite sides of the reflection sheet 40. The laser unit 10, the diffraction element 20, and the reflection unit 30 are located at the same side of the bottom surface 42. The reflection sheet 40 has a plurality of elongated openings 45. The longitudinal direction of each of the elongated openings 45 is parallel to the first direction X. The reflection unit 30 faces the elongated openings 45.

The diverging unit 50 can be used as a secondary lens. The diverging unit 50 corresponding to an elongated opening 45 is substantially an elongated semi-cylinder to match the linear optical field distribution. The longitudinal direction of the diverging unit 50 is parallel to the first direction X and the diverging unit 50 is configured to diverge the diffracted light along a second direction Y which is perpendicular to the first direction X. In present embodiment, the cross-section of the diverging unit 50 is substantially a semicircle as shown in FIG. 1. The diverging unit 50 includes an incident surface 52 and a light output surface 54. The incident surface 52 is a flat surface and the light output surface 54 is a convex surface. The diverging unit 50 is carried on the reflection surface 44 and covers the elongated opening 45. Specifically, a part of the incident surface 52 is in direct contact with the reflection surface 44.

The diffusion plate 60 is positioned above the plurality of diverging units 50, and opposite to the reflection surface 44 and the light output surface 54. The light passing through the diffusion plate 60 becomes a uniform and planar; that is, the diffusion plate 60 can scatter the light output from the plurality of diverging units 50 to simulate a uniform and planar light source.

During operation of the backlight module, the collimated light is emitted from the laser unit 10 (collimated red, green, and blue light), and then passes through the diffraction element 20 to form a linear laser light source along the first direction X; the linear laser light is then reflected by the reflection unit 30 and passes through the elongated opening 45 of the reflection sheet 40. The linear laser light thereafter strikes the diverging unit 50 as incident light from the incident surface 52 to form a planar light source by diverging the linear light source via the diverging unit 50 along the second direction Y, wherein the second direction Y is perpendicular to the first direction X. The light emitted from the light output surface 54 of the diverging unit 50 has a planar optical distribution. After the planar light passes through the diffusion plate 60, the planar light distribution becomes more uniform, that is, the divergent laser light from the diverging unit 50 has become a uniform and planar light source.

In the present embodiment, the backlight module 100 uses the diffraction unit 20 and the diverging unit 50 to change the light of the laser unit 10 from a point laser light source to a planar laser light source, so a lesser light source can be applied to the LCD of each unit display area to reduce cost and generated heat. Meanwhile, the backlight module using red, green, and blue laser light provides a wider color reproduction range and a greater clarity and vividness to the display.

Figure 3:
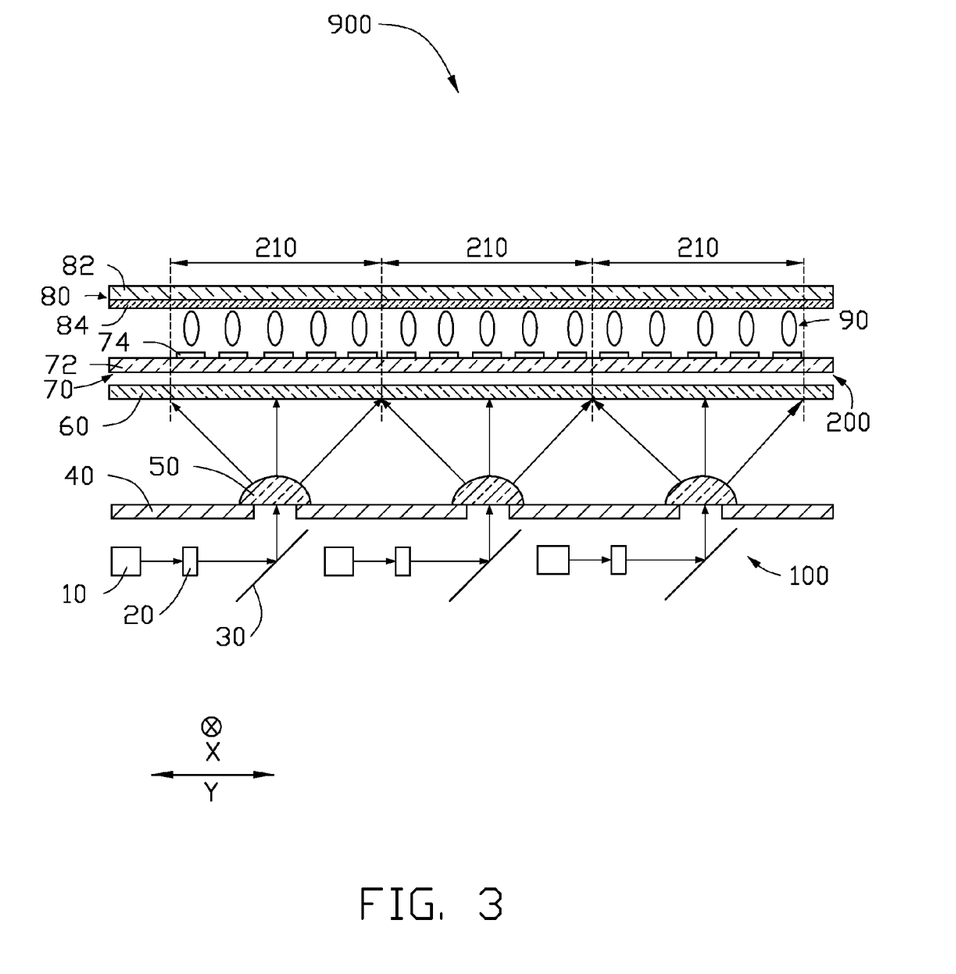
FIG. 3 is a diagrammatic sectional view of a liquid crystal display device according to a second embodiment of the present disclosure.

FIG. 3 shows a liquid crystal display device 900 in accordance with a first embodiment of the present disclosure. The liquid crystal display device 900 using the already-described backlight module includes a backlight module 100 and a liquid crystal display panel 900. The backlight module 100 will not be described again in detail.

The liquid crystal display panel 900 is located above the diffusion plate 60, that is, the liquid crystal display panel 900 is positioned at a side of diffusion plate 60 away from the diverging unit 50 which provides a backlight source for the liquid crystal display panel 900. The liquid crystal display panel 900 includes an array substrate 70, a liquid crystal layer 90, and a counter substrate 80 in that order following the diffusion plate 60. The liquid crystal layer 90 is sandwiched between the array substrate 70 and the counter substrate 80.

The array substrate 70 includes a first transparent substrate 72, a plurality of switches (not shown) disposed on the first transparent substrate 72, and a plurality of transparent pixel electrodes 74. The pixel electrodes 74 are connected with the plurality of switches. The plurality of switches and the plurality of pixel electrodes 74 are disposed on the side of the first transparent substrate 72 facing the liquid crystal layer 90. The plurality of switches and the plurality of pixel electrodes 74 are separately arranged in an array. In the present embodiment, each one of the plurality of switches is formed as a low-temperature poly-crystal silicon (LTPS) thin film transistor (TFT) with a quick response time. The plurality of switches can turn on or turn off quickly. Each one of the plurality of pixel electrodes 74 is made of indium tin oxide (ITO) or other transparent conductive materials.

The counter substrate 80 includes a second transparent substrate 82 and a common electrode 84 disposed on the second transparent substrate 82. The common electrode 84 is directly formed on the side of the second transparent substrate 82 toward the liquid crystal layer 90. The common electrode 84 is made of ITO or other transparent conductive materials. The common electrode 84 is transparent.

The liquid crystal layer 90 is disposed between the plurality of pixel electrodes 74 and the plurality of the common electrodes 84. The common electrode 84 is coupled to a reference voltage. The plurality of switches can be turned on or off individually. The voltage level required to turn-on the plurality of switches decides the bias voltage value of the corresponding pixel electrode 74. The degree of rotation of the liquid crystal, which is dependent on the voltage difference between the pixel electrode 74 and the common electrode 84, controls the light transmission rate of the pixel area corresponding to the pixel electrode 74.

Figure 4:
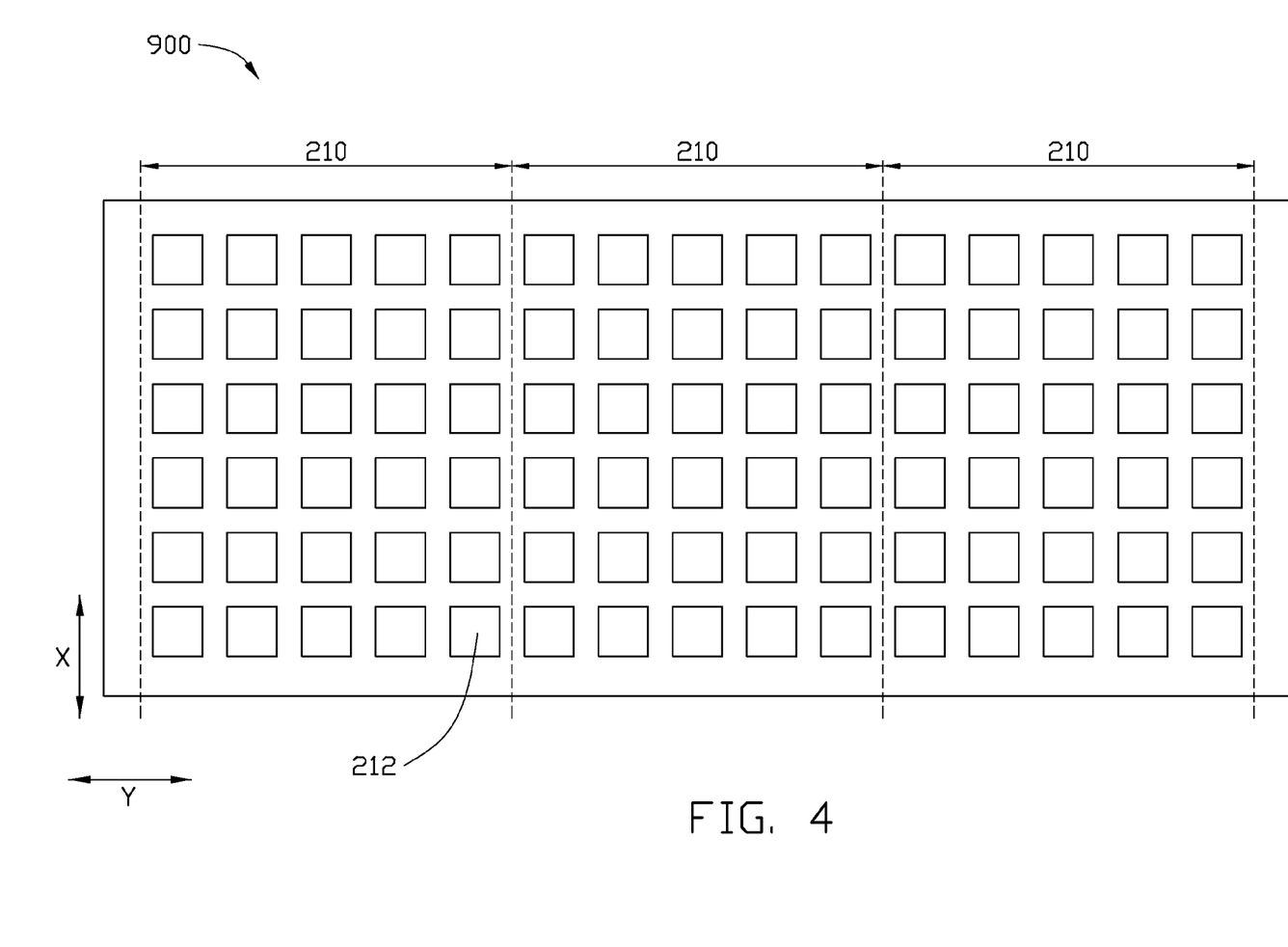
FIG. 4 is a diagrammatic view of the liquid crystal display device according to the second embodiment of the present disclosure.

FIG. 4 shows a plan view of the liquid crystal display device panel 900 with a plurality of pixel areas 210. Each pixel area 210 corresponds to a diverging unit 50. Light emitted from the laser unit 10, diffracted by the diffraction unit 20, diverged by the diverging unit 50, and diffused by the diffusion plate 60, provides a planar backlight light source for a corresponding pixel area 210. Each pixel area 210 includes a plurality of pixels 212. Each pixel 212 corresponds to a pixel electrode 74 and a switch connected to the pixel electrode 74. In addition, each pixel 212 controls the light transmission rate according to the voltage difference between a corresponding pixel electrode 74 and the common electrode 84, and the grayscale level of the light from pixel 212 is thus controlled.

During the operation of liquid crystal display device, the first laser light source 12, the second laser light source 14, and the third laser light source 16 can be sequentially turned on or turned off according to an alternating control cycle; that is, the laser unit 10 sequentially alternates in cycles to provide red, green, and blue backlight for a pixel area 210. At the same time, all of the pixels 212 within the same pixel area 210 pass through the same color light.

Although imperceptible to the human eye, the red, green, and blue light sequentially emitted from the laser unit 10 individually passes through the pixel 212 based on the grayscale light predetermined by the pixel 212, so that, to the human eye, each pixel 212 shows a particular color, that is, each pixel 212 is individually used as a display pixel.

Figure 5:
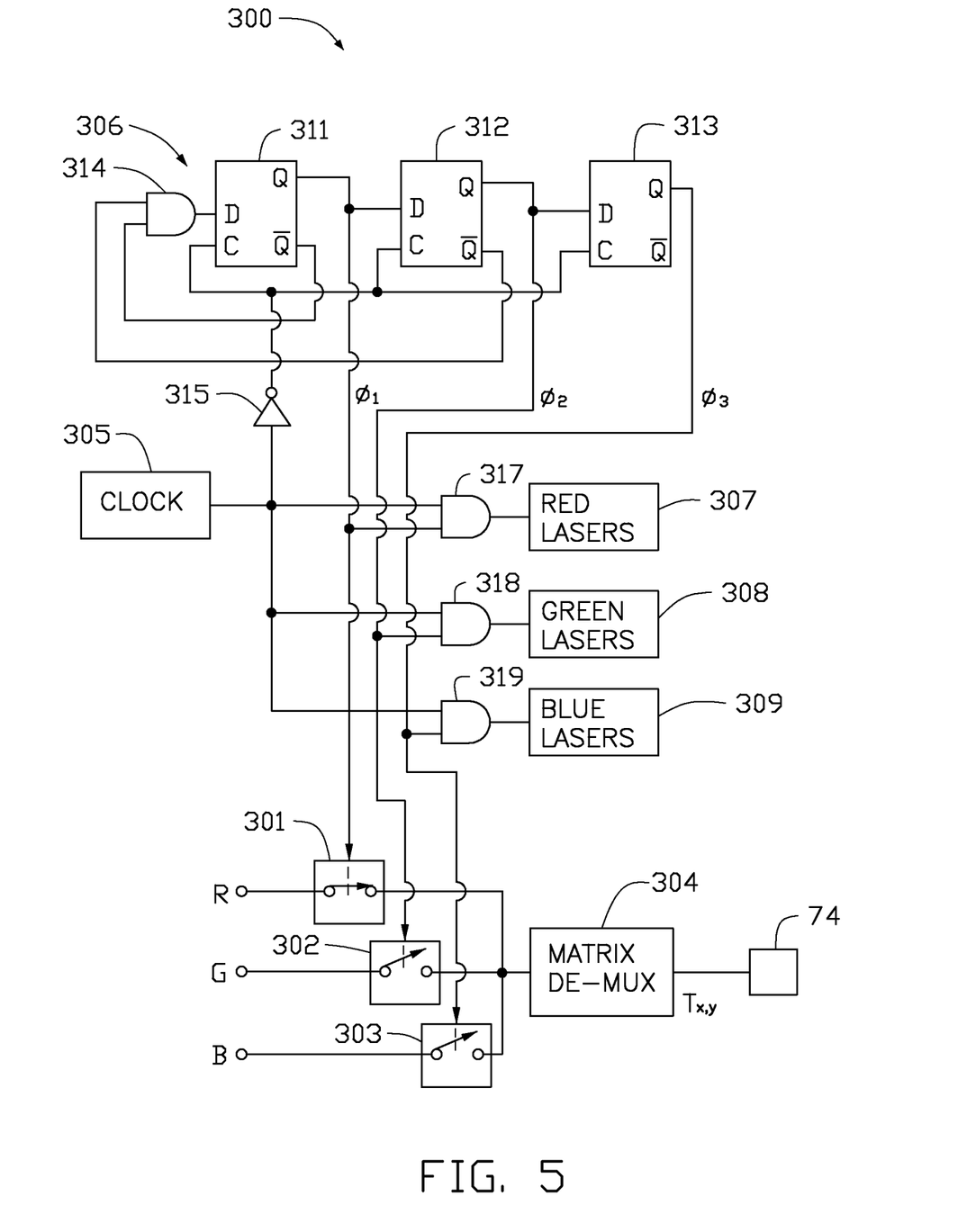
FIG. 5 is a diagrammatic view of a control system for the liquid crystal device according to the second embodiment.

Specifically, the plurality of laser units 10 are connected to a control system 300, for example as shown in FIG. 5. The control system turns on and turns off sequentially and cyclically the first laser light source 12, the second laser light source 14, and the third laser light source 16. When the first laser light source 12 is turned on and emits red light, and both of the second laser light source 14 and the third laser light source 16 are off, all of the pixels 212 within a pixel area 210 are turned on, and the red light passes through all of the pixels 212. The transmission rate of the red light for each of the pixels within the pixel region 210 is controlled by a switch 301. Similarly, when the second laser light source 14 is turned on and both of the first laser light source 12 and the third laser light source 16 are off, all of the pixels 212 within a pixel area 210 are turned on so that the green light passes through all of the pixels 212. The transmission rate of the green light for each of the pixels within the pixel region 210 is then controlled by a switch 302. When the third laser light source 16 is turned on, and both of the first laser light source 12 and the second laser light source 14 are off, all of the pixels 212 within a pixel area 210 are turned on to make the blue laser light pass through. But the transmission rate of the blue light for each of the pixels within the pixel region 210 is also controlled by a switch 303. Therefore, each pixel of the pixel area 210 corresponding to a diverging unit 50 and a laser unit 10 can sequentially display red, green, and blue color with a predetermined grayscale light level to show a specific color.

In the example of FIG. 5, the switches 301, 302, and 303 pass a frame of selected red (R), green (G), or blue (B) video to conventional matrix de-multiplexing circuitry 304 that provides a respective transmission value (Tx,y) of voltage to each pixel electrode 74. This matrix de-multiplexing circuitry 304 can be the kind typically found in a black- and white LCD display. For example, the matrix de-multiplexing circuitry samples and holds a new value (Tx,y) of the voltage for each successive frame of red (R), green (G), or blue (B) video.

In the example of FIG. 5, the control system 300 operates in response to a clock generator 305 producing a periodic clock signal at three times the usual color video frame rate. A shift counter 306 divides the periodic clock signal by three to produce three non-overlapping three-phase clock signals φ1, φ2, φ3, each at the usual frame rate. The first phase clock signal φ1 enables the first switch 301 and the red lasers 307 for de-multiplexing and display of a red frame. The second phase clock signal φ2 enables the second switch 302 and the green lasers 308 for de-multiplexing and display of a green frame. The third phase clock signal φ3 enables the third switch 303 for de-multiplexing and display of a blue frame. Therefore the sequential display of the red frame followed by the green frame followed by the blue frame displays a composite color picture similar to that of a conventional color video frame.

The shift counter 306 includes a first delay flip-flop 311, a second delay flip-flop 312, a third delay flip-flop 313, and an AND gate 314 providing feedback from the Q bar outputs of the first and second delay flip-flops 311, 312 to the D input of the first delay flip flop 311. The control system 300 includes an additional inverter 315 and AND gates 317, 318, 319 responsive to the periodic clock signal from the clock generator 305 for ensuring that for each red, green, or blue frame, the video data is first transmitted to the pixel electrodes 74, then there is a first duration of time for the LCD to respond to the new voltages on the pixel electrodes (when the signal from the clock 305 is a logic low and the lasers are turned off), and then the lasers of the respective frame color are turned on for a second duration of time (when the signal from the clock 305 is a logic high). At the end of the frame, the lasers are turned off, and the shift counter 306 is incremented to begin control of a next red, green, or blue video frame.

Figure 6:
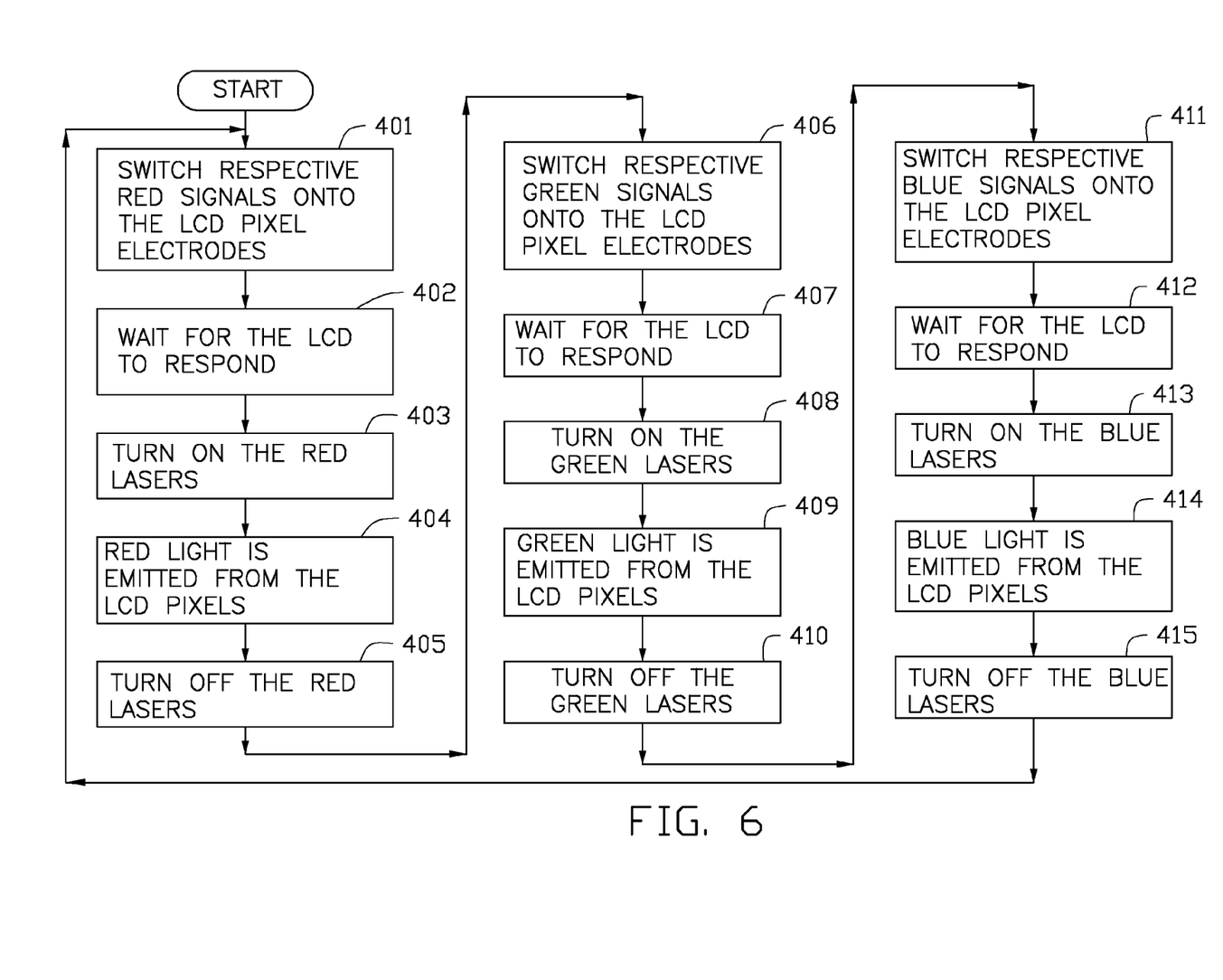
FIG. 6 is a flow chart of a control sequence of the control system of FIG. 5.

A control sequence of the control system 300 is shown in FIG. 6. In a first box 401, respective red signals are switched onto the LCD pixel electrodes. Then, in box 402, the control system waits a first duration of time for the LCD to respond to the red signals. Then, in box 403, the red lasers are turned on. Then, in box 404, red light is emitted from the LCD pixels for a second duration of time. Then, in box 405, the red lasers are turned off. Next, in box 406, respective green signals are switched onto the LCD pixel electrodes. Then, in box 407, the control system waits the first duration of time for the LCD to respond to the green signals. Then, in box 408, the green lasers are turned on. Then, in box 409, green light is emitted from the LCD pixels for the second duration of time to display a green video frame. Then, in box 410, the green lasers are turned off. Next, in box 411, respective blue signals are switched onto the LCD pixel electrodes. Then, in box 412, the control system waits the first duration of time for the LCD to respond to the blue signals. Then, in box 413, the blue lasers are turned on. Then, in box 414, blue light is emitted from the LCD pixels for the second duration of time to display a blue video frame. Then, in box 415, the blue lasers are turned off. Then control returns to box 401 to repeat another cycle of the control sequence.

Preferably, the plurality of laser units 10 can alternately and sequentially turn on the first laser light source 12, the second laser light source 14, and a third laser light source 16 in that same order for each cycle. The plurality of the laser units 10 can each have a different order of turning on in the alternating cycle. For example, one laser unit 10 can first turn on the first laser light source 12, and then open the second laser light source 14, and finally open the third laser light source 16. Another laser unit 10 can first turn on the third laser light source 16, and then turn on the second laser light source 14, and finally turn on the first laser light source 12.

In the present embodiment, the backlight module 100 of the liquid crystal display device 900 can turn on the first laser light source 12, a second laser light source 14, and the third laser light source 16 according to the alternating sequence of each cycle. The red laser light, the green laser light, and the blue laser light are sequentially, alternately, and cyclically passed through each pixel 212 in accordance with a predetermined order of the grayscale light levels to display specific colors. Thus, the liquid crystal display panel 900 of the liquid crystal display device 900 does not require color filters. Since the red, green, and blue laser light are sequentially turned on and passed through each pixel 212, the pixel 212 does not need to be divided into three dedicated sub-pixels for each pixel; thus, the number of switches for the array substrate 70 can be reduced to one third of that for a conventional array substrate and can greatly improve the aperture ratio of the liquid crystal display panel.

In other embodiments, as the liquid crystal display device operates, the control system is also able to make a laser unit 10 emit a single color or composite light according to the display requirement, so that a pixel area 210 can be used as a display pixel. For example, the first laser light source 12 and the second laser light source 14 can be turned on at the same time, and the third laser light source 16 can be turned off. The red light emitted from the first laser light source 12 and the green light emitted from the second laser light source 14 are mixed to provide a color of light for a pixel area 210. All of the pixels 212 within the pixel area 210, to the human eye, shown yellow. Therefore, each pixel area 210 can be used as a display area, especially for a large-size liquid crystal display device. The size of each pixel within a pixel area can be increased to reduce the number of individual pixels in the pixel area, this can also reduce the number of the switches corresponding to the pixels.

The embodiments shown and described above are only examples. Many details are often found in the art such as the other features of a backlight module. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, especially in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A backlight module, comprising:
    a laser unit, comprising:
        a first laser light source emitting a red laser light;
        a second laser light source emitting a green laser light;
        a third laser light source emitting a blue laser light;
        wherein the first laser light source, the second laser light source, and the third laser light source are arranged along a straight line in a first direction;
    a diffraction unit corresponding to the laser unit, which is positioned at the output light path of the laser unit, the diffraction unit comprising
        a first diffraction element that is corresponding to the first laser light source and is configured to diffract said red laser light from a point laser light source to a linear laser light source with a linear optical distribution;
        a second diffraction element that is corresponding to the second laser light source and is configured to diffract said green laser light from a point laser light source to a linear laser light source with a linear optical distribution;
        a third diffraction element that is corresponding to the third laser light source and is configured to diffract said blue laser light from a point laser light source to a linear laser light source with a linear optical distribution; and
    a diverging unit, that is corresponding to the diffraction unit and is substantially an elongated semi-cylinder to match the liner optical field distribution, the longitudinal direction of the diverging unit is along the first direction and the diverging unit is configured to diverge the diffracted laser light along a second direction which is perpendicular to the first direction.

2. The backlight module according to claim 1, wherein said backlight module further comprises:
    a reflection unit, which is corresponding to the diffraction unit and positioned at a side of the diffraction unit far from the laser unit, and the reflection unit is configured to reflect the light emitted from said diffraction unit to said corresponding diverging unit.

3. The backlight module according to claim 1, wherein said backlight module further comprises:
    a bottom reflection sheet including a bottom surface and a reflection surface, wherein said bottom surface and said reflection surface are position at different sides of the reflection sheet, and wherein the bottom reflection sheet includes a plurality of elongated openings which are corresponding to a plurality of diverging units which are carried on said reflection surface to cover the elongate openings, and said bottom surface is positioned at the same side of said laser unit and said diffraction unit.

4. The backlight module according to claim 1, wherein said backlight module further comprises:
    a diffusion plate corresponding to the diverging unit, which is configured to uniformly diffuse the light emitted from the diverging unit.

5. A liquid crystal display device, comprising:
    a backlight module, comprising:

a laser unit, comprising:
   a first laser light source emitting a red laser light;
   a second laser light source emitting a green laser light;
   a third laser light source emitting a blue laser light;
   wherein the first laser light source, the second laser light source, and the third laser light source are arranged along a straight line in a first direction;
a diffraction unit, that is corresponding to the laser unit and is positioned at an output light path of the laser unit, the diffraction unit comprising:
   a first diffraction element that is corresponding to the first laser light source and is configured to diffract said red laser light from a point laser light source to a linear laser light source with a linear optical distribution;
   a second diffraction element that is corresponding to the second laser light source and is configured to diffract the green laser light from a point laser light source to a linear laser light source with a linear optical distribution;
   a third diffraction element that is corresponding to the third laser light source and is configured to diffract the blue laser light from a point laser light source to a linear laser light source with a linear optical field distribution; and
a diverging unit, that is corresponding to the diffraction unit and is substantially a elongated semi-cylinder to match the liner optical field distribution, the longitudinal direction of the diverging unit is along the first direction and the diverging unit is configured to diverge said diffracted laser light along a second direction which is perpendicular to the first direction; and
a liquid crystal display panel arranged to receive light emitted from said diverging unit, and a control system electronically coupled to said first laser, said second laser and said third laser for sequentially turning on and turning off said first laser, said second laser, and said third laser in an alternating or cyclical control order.

6. The liquid crystal display device according to claim 5, wherein said backlight module further comprises:
   a reflection unit, which is corresponding to the diffraction unit and positioned at a side of the diffraction unit far from the laser unit, the reflection unit is configured to reflect the light emitted from the diffraction unit to corresponding said diverging unit.

7. The liquid crystal display device according to claim 5, wherein said backlight module further comprises:
   a bottom reflection sheet including a bottom surface and a reflection surface, wherein said bottom surface and said reflection surface are position at different sides of the reflection sheet,
   and wherein the bottom reflection sheet includes a plurality of elongated openings which are corresponding to a plurality of diverging units which are carried on said reflection surface to cover the elongate openings, and said bottom surface is positioned at the same side of said laser unit and said diffraction unit.

8. The liquid crystal display device according to claim 5, wherein said backlight module further comprises:
   a diffusion plate, that is corresponding to the diverging unit and is configured to uniformly diffuse the light emitted from the diverging unit.

9. The liquid crystal display device according to claim 5, wherein said liquid crystal panel further comprises:
   a plurality of pixel areas, each pixel area is corresponding to the diverging unit and includes a plurality of pixels, wherein each pixel defines a transmission rate of the light passing through the pixel.

10. The liquid crystal display device according to claim 5, wherein said liquid crystal panel comprises:
   an array substrate;
   a counter substrate facing said array substrate; and
   a liquid crystal layer sandwiched between said array substrate and said counter substrate.

11. A liquid crystal display device, comprising:
   a liquid crystal display panel extending along a first direction and a second direction perpendicular to the first direction;
   a backlight module arranged to backlight the liquid crystal display panel, the backlight module including a diverging unit elongated along the first direction and configured to receive a linear optical field distribution along the first direction and diverge the linear optical field distribution along the second direction to illuminate a region of the liquid crystal display panel with light diverged from the linear optical field distribution; a first laser light source emitting a red laser light, a second laser light source emitting a green laser light, a third laser light source emitting a blue laser light, a first diffraction element configured to diffract the red laser light from the first laser light source to a first linear laser light source with a linear optical field distribution along the first direction, a second diffraction element configured to diffract the green laser light from the second laser light source to a second linear laser light source with a linear optical field distribution along the first direction, a third diffraction element configured to diffract the blue laser light from the third laser light source into a third linear light source with a linear optical field distribution along the first direction, and wherein the first and second and third light sources are arranged to direct their linear optical field distributions into the diverging unit to illuminate the region of the liquid crystal display panel with the red laser light, the green laser light, and blue laser light; and
   a control system electronically coupled to the liquid crystal display panel to sequentially send frames of red, green, and blue video data of a color video signal to the liquid crystal display panel, and electronically coupled to the first, second, and third laser light sources to sequentially turn on and turn off the first, second, and third laser light sources to sequentially display red, green, and blue video frames of the color video signal on the liquid crystal display panel.

* * * * *